US011970018B2

(12) United States Patent
Nishimura et al.

(10) Patent No.: US 11,970,018 B2
(45) Date of Patent: Apr. 30, 2024

(54) TRIMMER

(71) Applicant: Horizon International Inc., Takashima (JP)

(72) Inventors: Osamu Nishimura, Takashima (JP); Kazuyuki Fukushima, Takashima (JP); Satoshi Tsunawaki, Takashima (JP)

(73) Assignee: Horizon International Inc., Shiga (JP)

( * ) Notice: Subject to any disclaimer, the term of this patent is extended or adjusted under 35 U.S.C. 154(b) by 286 days.

(21) Appl. No.: 17/031,751

(22) Filed: Sep. 24, 2020

(65) Prior Publication Data

US 2021/0094337 A1 Apr. 1, 2021

(30) Foreign Application Priority Data

Oct. 1, 2019 (JP) ................................ 2019-181271

(51) Int. Cl.
*B26D 1/00* (2006.01)
*B26D 1/09* (2006.01)
(Continued)

(52) U.S. Cl.
CPC .............. *B42C 5/00* (2013.01); *B26D 1/0006* (2013.01); *B26D 1/09* (2013.01); *B26D 7/015* (2013.01);
(Continued)

(58) Field of Classification Search
CPC ........ B26D 7/0675; B26D 7/015; B26D 1/09; B26D 1/006; B26D 1/0006;
(Continued)

(56) References Cited

U.S. PATENT DOCUMENTS

| | | | |
|---|---|---|---|
| 7,493,840 | B2 | 2/2009 | Yamaguchi |
| 2005/0238462 | A1 | 10/2005 | Oota |

(Continued)

FOREIGN PATENT DOCUMENTS

| | | | |
|---|---|---|---|
| CN | 1692025 | A | 11/2005 |
| CN | 101032896 | A | 9/2007 |

(Continued)

OTHER PUBLICATIONS

Extended European Search Report for corresponding EP Application No. 20198873.0 dated Feb. 26, 2021.

(Continued)

*Primary Examiner* — Evan H MacFarlane
*Assistant Examiner* — Liang Dong
(74) *Attorney, Agent, or Firm* — Renner, Otto, Boisselle & Sklar, LLP

(57) ABSTRACT

It is an object to provide a trimmer that can trim a fore-edge portion of a bound material except a cover and that can be excellent in productivity and cost. A cover has flap portions adjacent to the fore-edge portion of the bound material, a trimmer includes: a trim cutter that trims the bound material; a blade receiving portion that receives an edge of the trim cutter; a base portion and a pressure portion that nip and position the bound material; and a pair of guide portions arranged for movement in a direction close to or away from the bound material, wherein the guide portions are inserted between the book block and the cover so as to peel the cover together with the flap portions up when the fore-edge portion of the bound material is trimmed by the trim cutter.

4 Claims, 11 Drawing Sheets

(51) Int. Cl.

| | |
|---|---|
| ***B26D 7/01*** | (2006.01) |
| ***B26D 7/06*** | (2006.01) |
| ***B42C 5/00*** | (2006.01) |
| *B26D 7/00* | (2006.01) |

(52) U.S. Cl.
CPC ...... *B26D 7/0675* (2013.01); *B26D 2001/004* (2013.01); *B26D 2007/0056* (2013.01)

(58) Field of Classification Search
CPC ...... B26D 2007/0056; B26D 2001/004; B26D 1/08; B42C 5/00; B42C 15/00
See application file for complete search history.

(56) References Cited

U.S. PATENT DOCUMENTS

| | | | | |
|---|---|---|---|---|
| 2006/0123969 | A1 * | 6/2006 | Fujita | B26D 7/025 83/697 |
| 2007/0210504 | A1 * | 9/2007 | Scarpellini | B26D 1/08 270/58.07 |
| 2015/0075344 | A1 * | 3/2015 | Hori | B26D 1/08 83/555 |
| 2016/0346945 | A1 | 12/2016 | Oiwa | |

FOREIGN PATENT DOCUMENTS

| | | | | |
|---|---|---|---|---|
| CN | 104349876 | A | 2/2015 | |
| CN | 208788761 | U | 4/2019 | |
| EP | 1745941 | A2 * | 1/2007 | B26D 1/09 |
| EP | 1745941 | A2 | 1/2007 | |
| JP | 2002-127637 | A | 5/2002 | |
| JP | 2004-066347 | A | 3/2004 | |
| JP | 2005-219168 | A | 8/2005 | |
| JP | 2011-045989 | A | 3/2011 | |
| JP | 2016-221667 | A | 12/2016 | |
| JP | 6100249 | B2 | 3/2017 | |
| WO | 20130179380 | A1 | 12/2013 | |

OTHER PUBLICATIONS

Office Action for corresponding CN Application No. 202011036907.5 dated Mar. 16, 2023, with partial English language translation.
Decision to Grant for corresponding JP Patent Application No. 2019-181271 dated Jul. 18, 2023, with English machine translation.

* cited by examiner

[Fig. 1(A)]
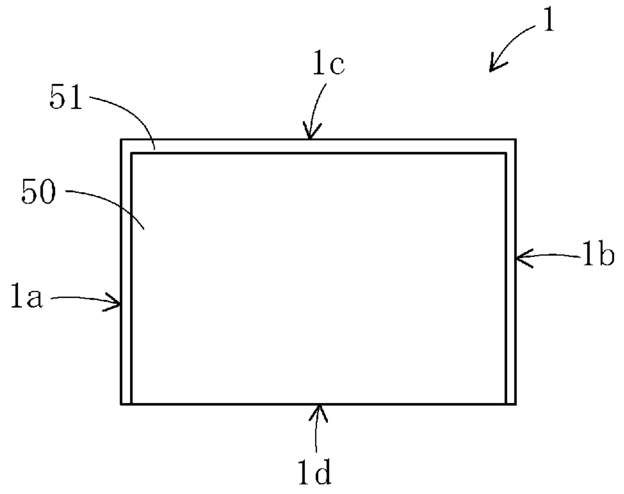
[Fig. 1(B)]
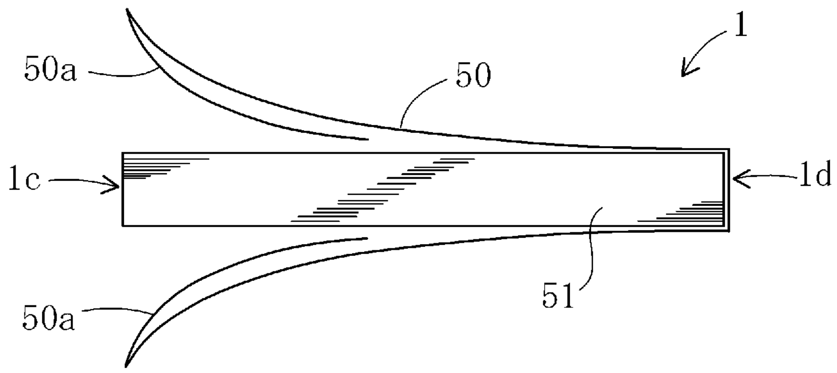

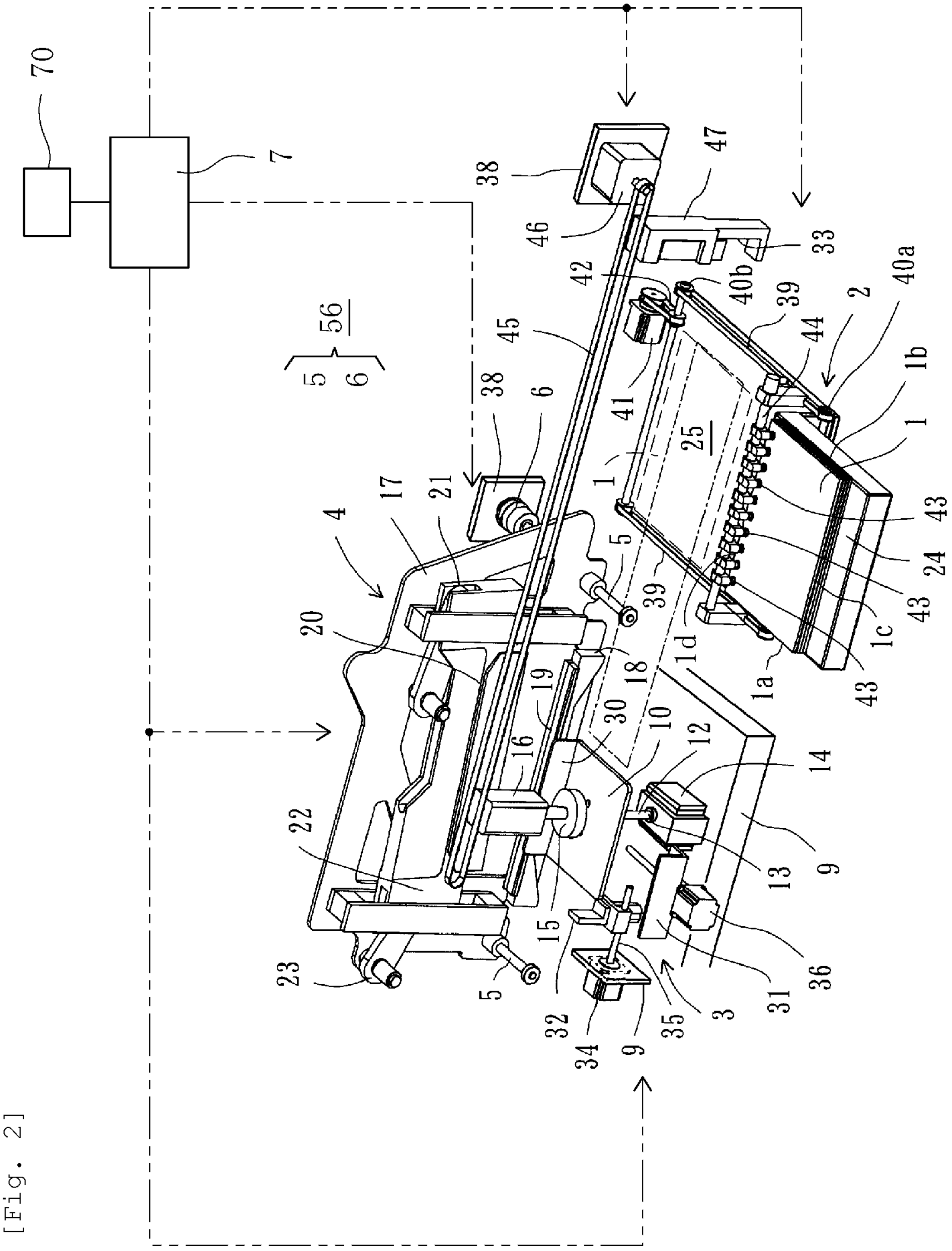
[Fig. 2]

[Fig. 3]
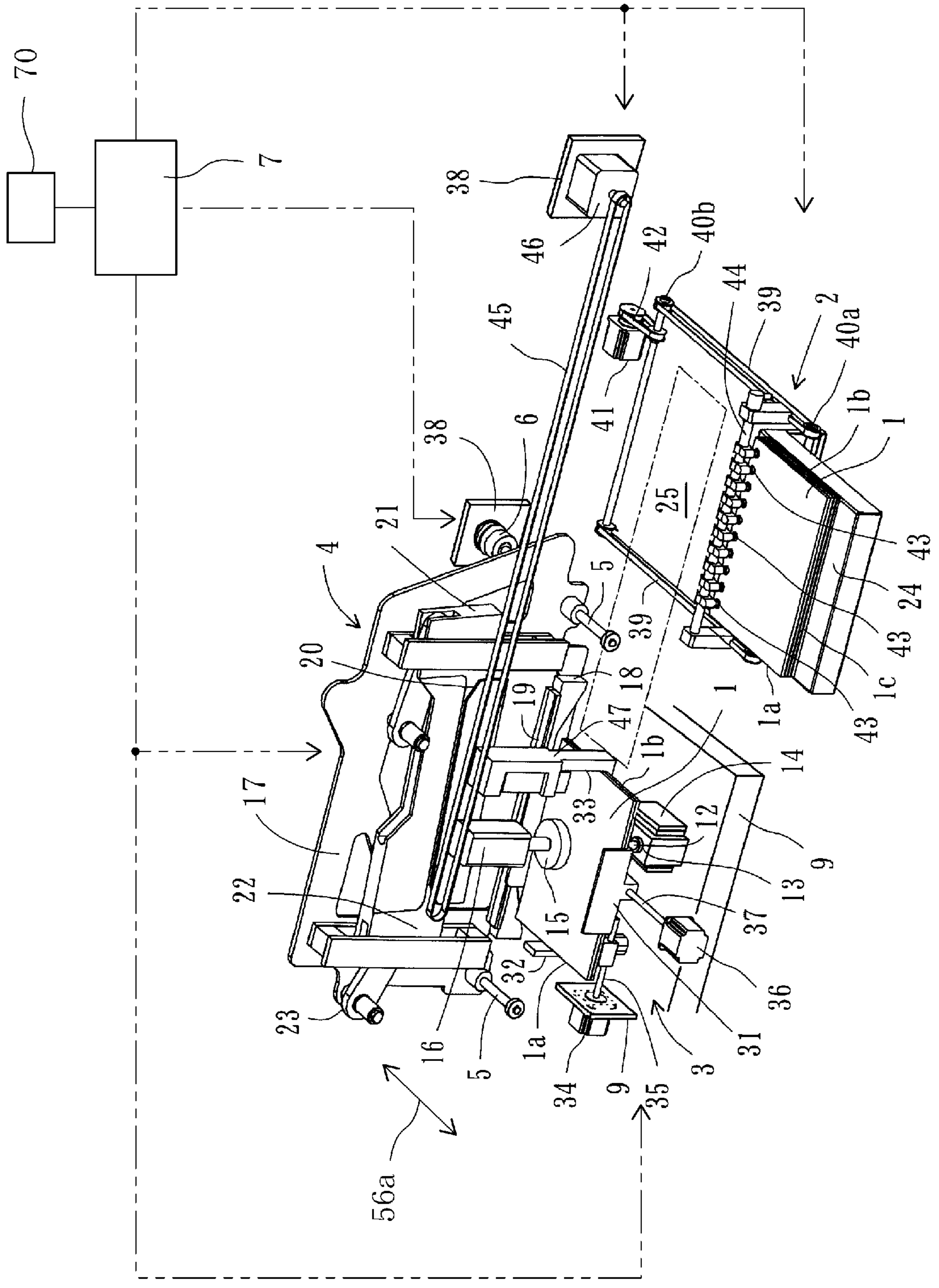

[Fig. 4]
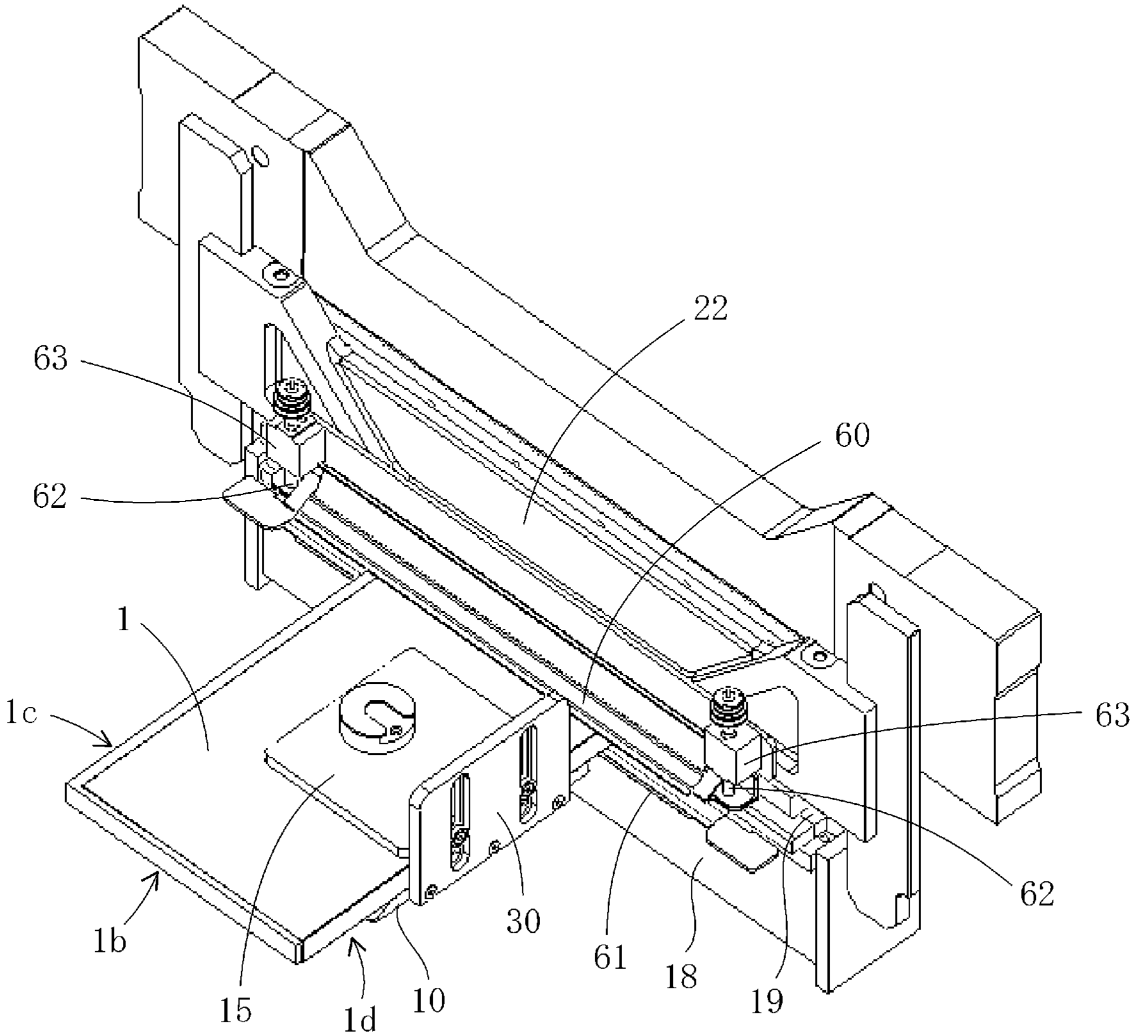

[Fig. 5]
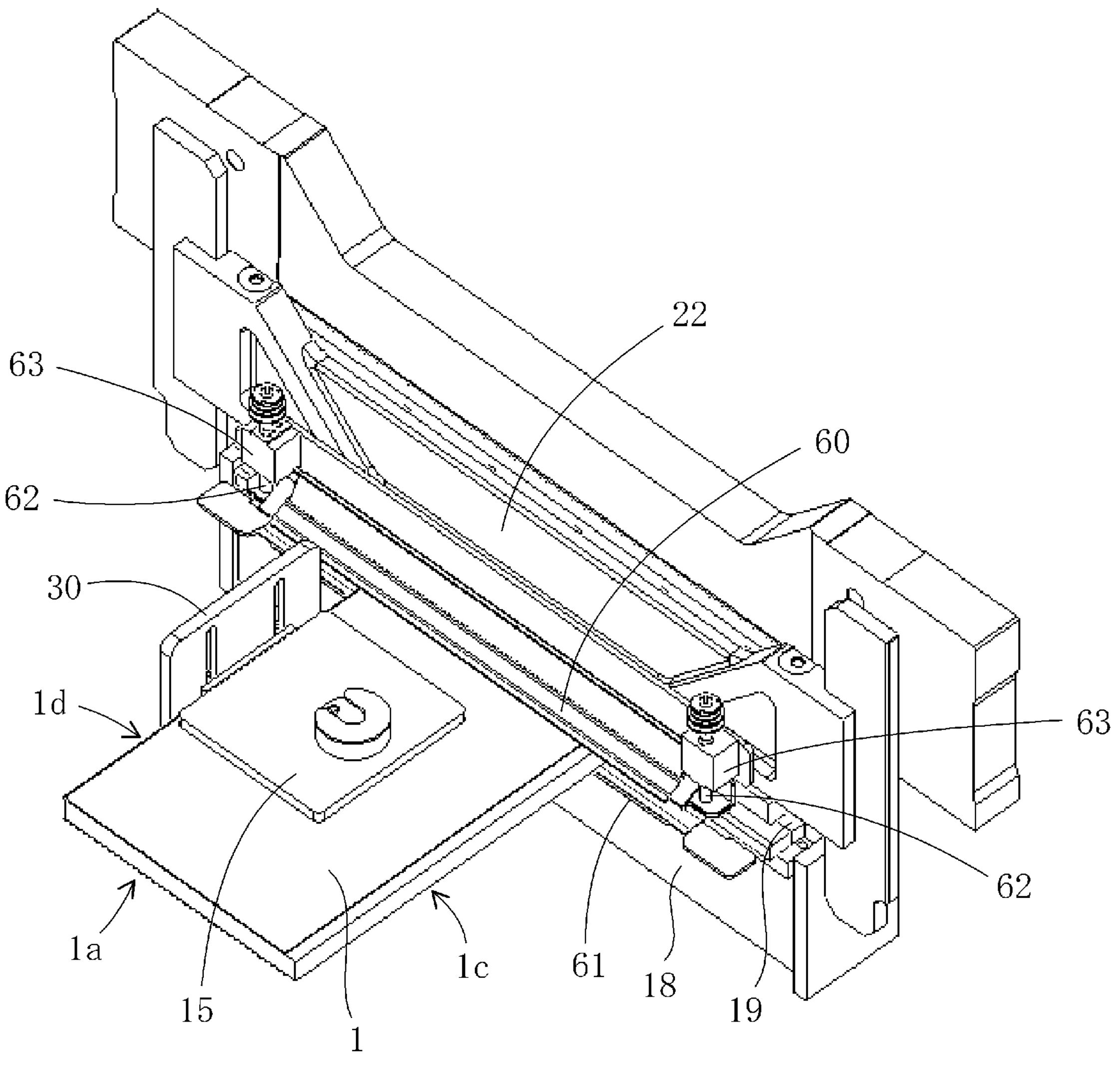

[Fig. 6]
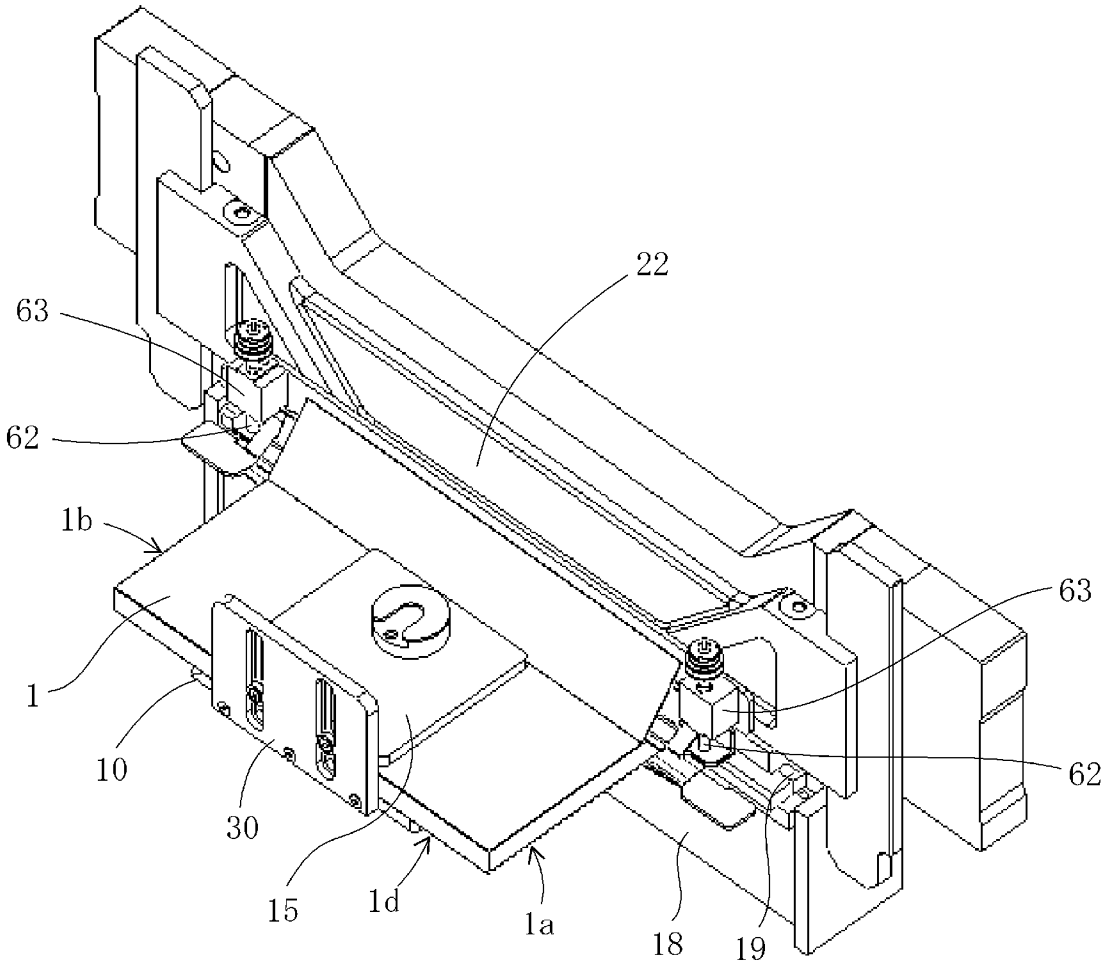

[Fig. 7]
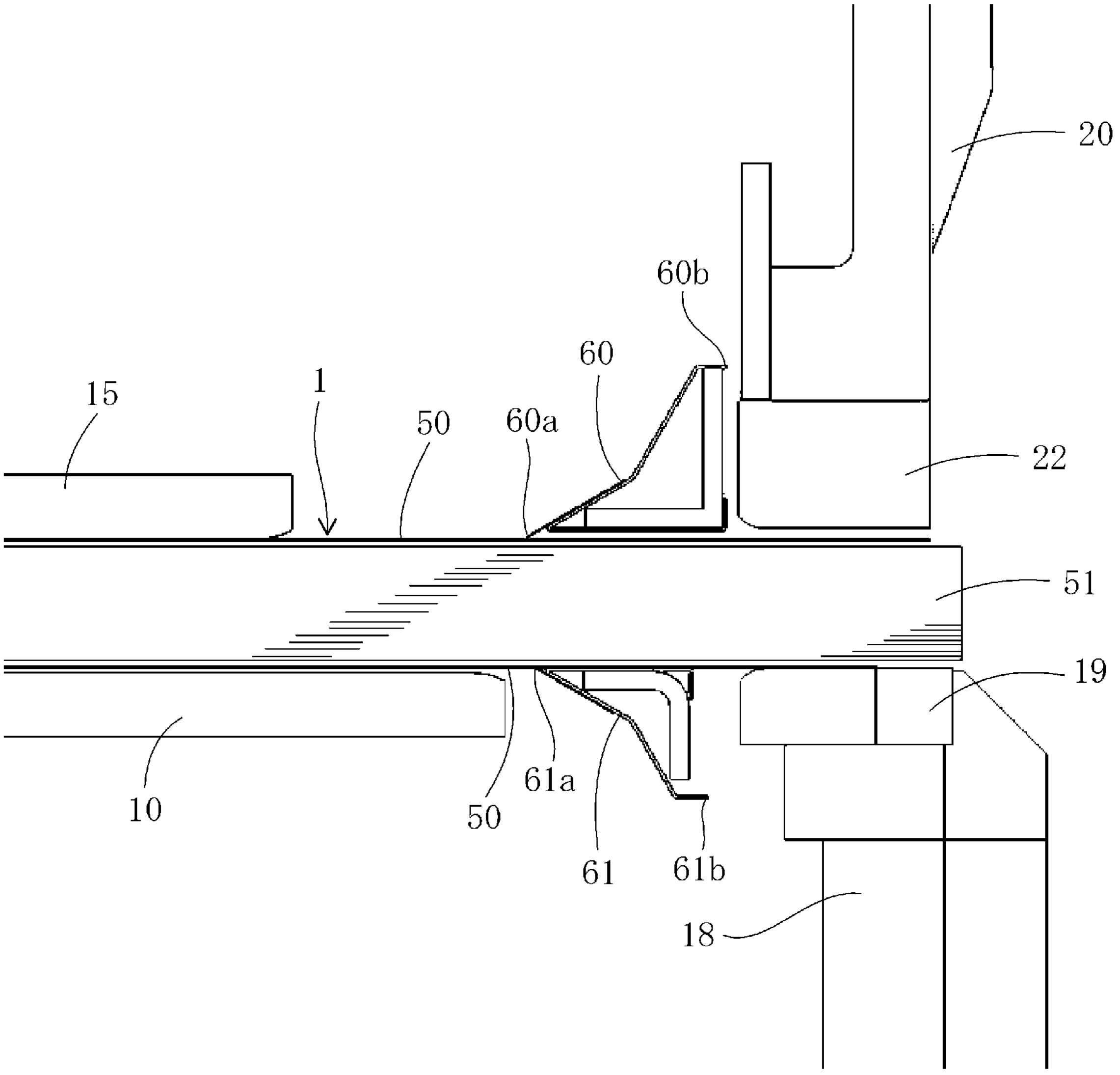

[Fig. 8]
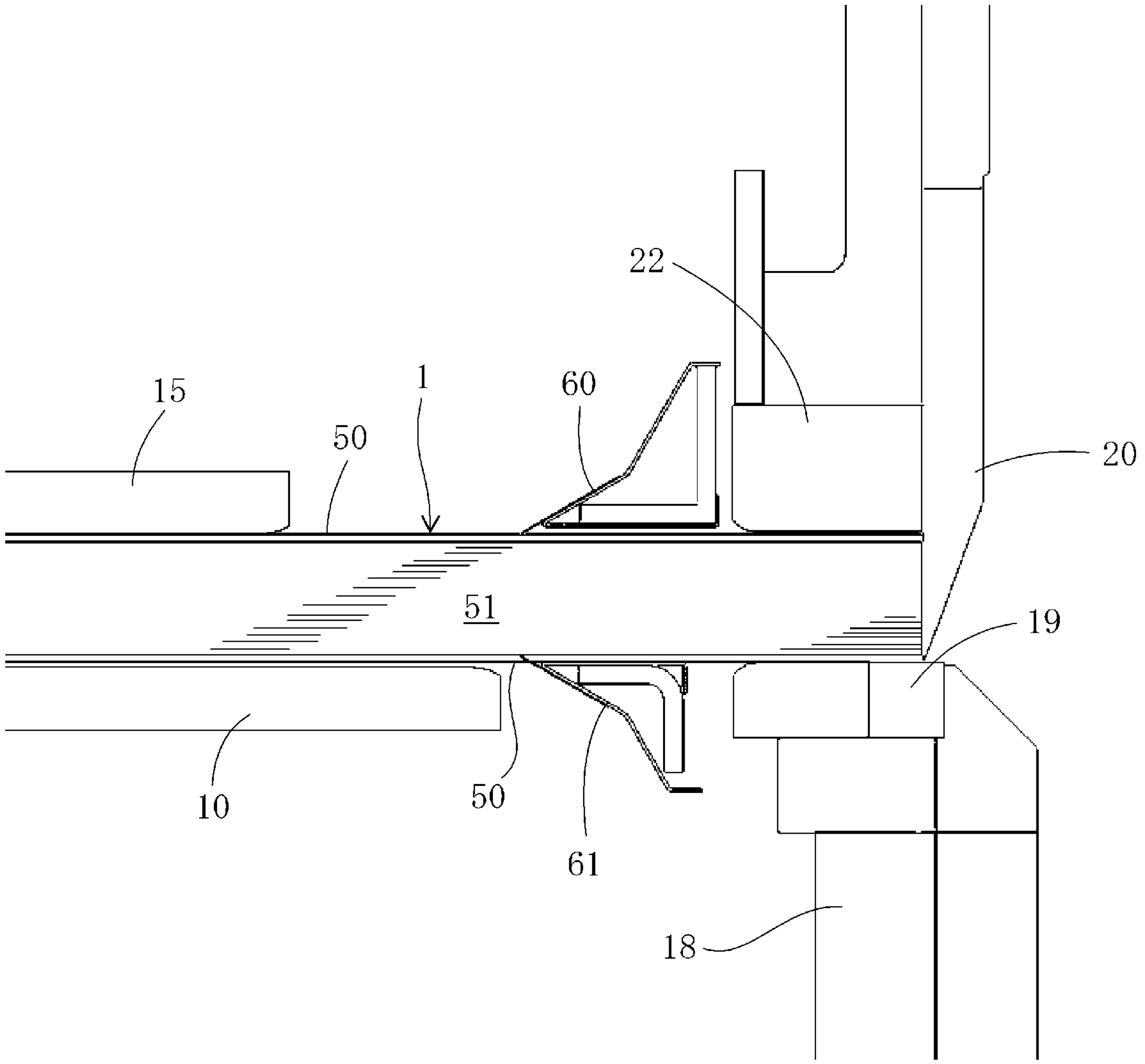

[Fig. 9]
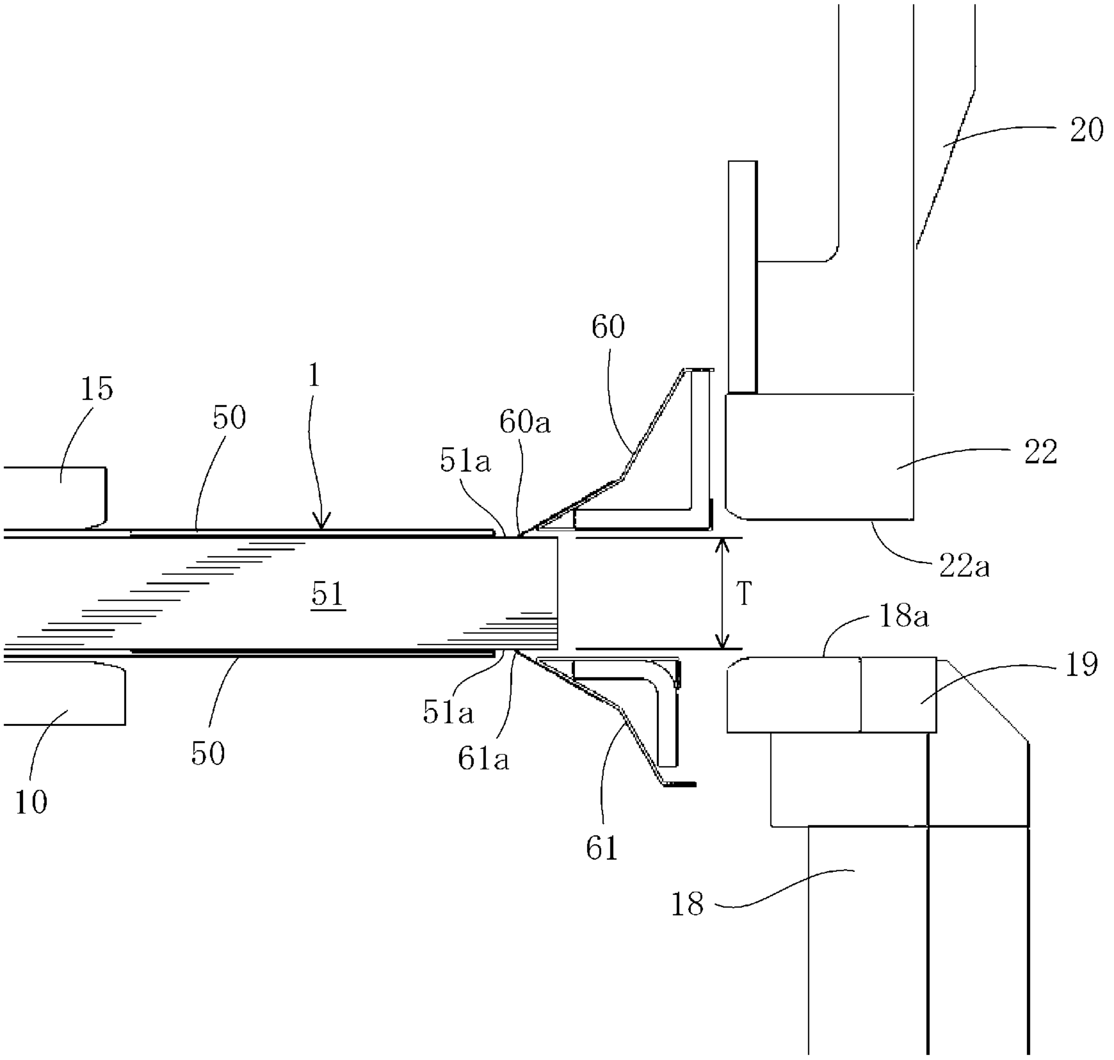

[Fig. 10]
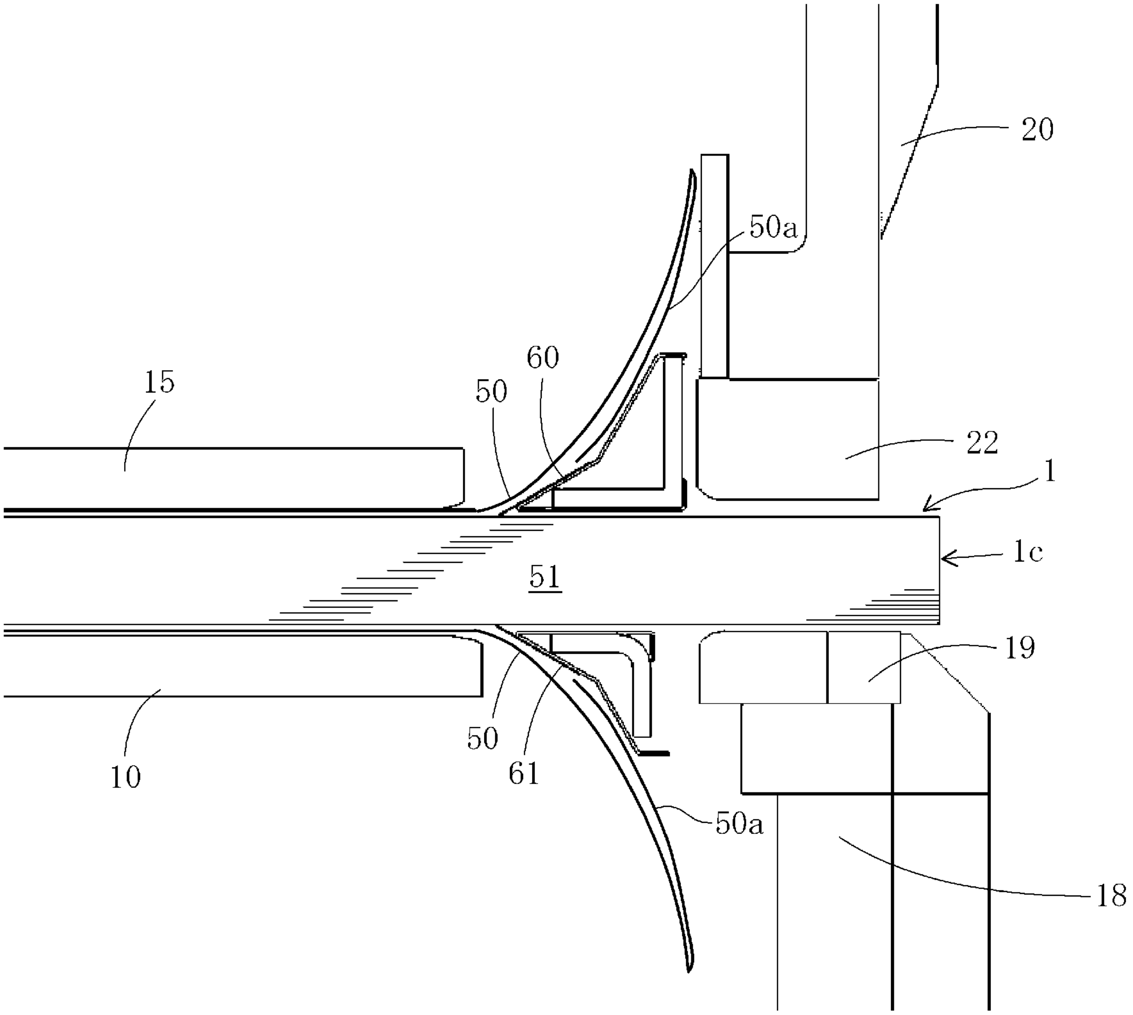

[Fig. 11]
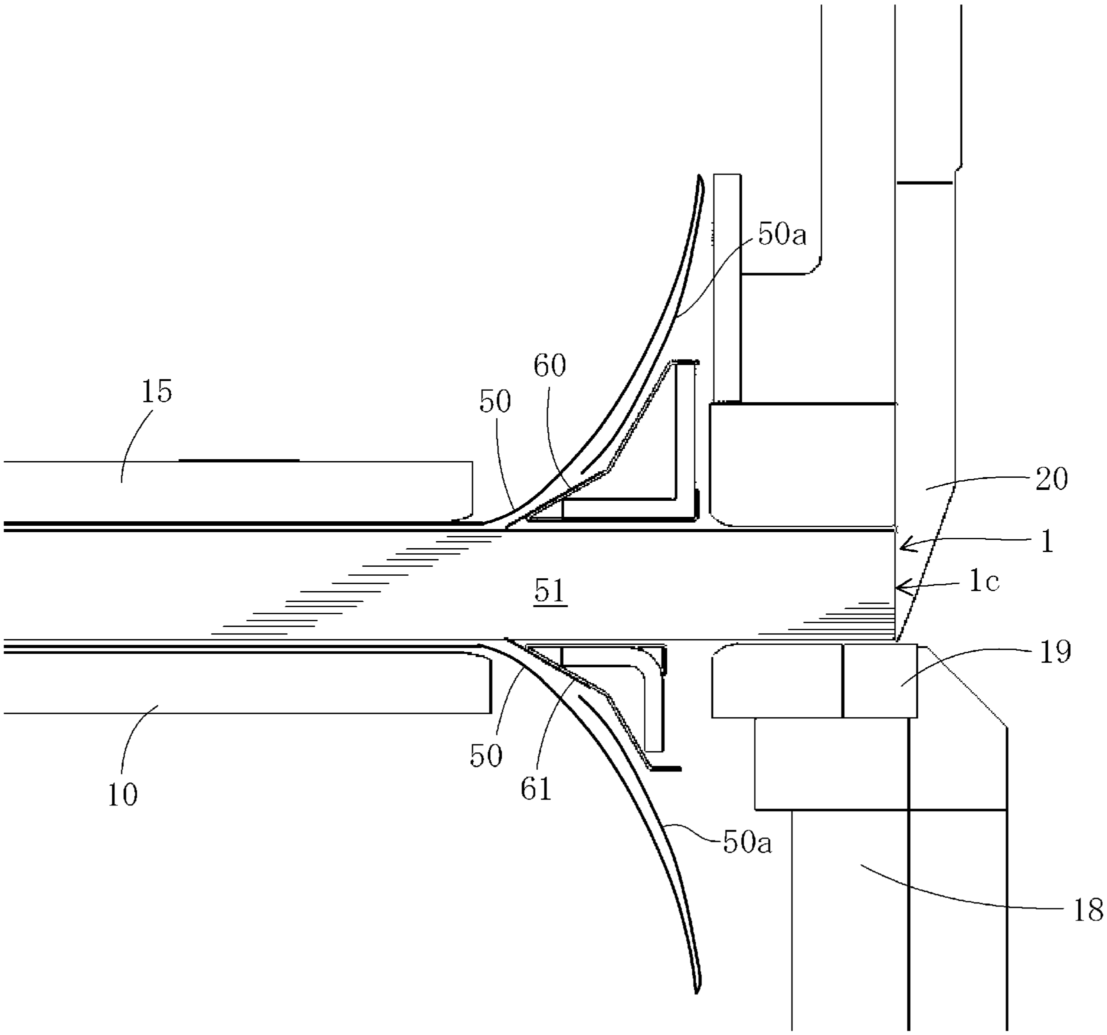

TRIMMER

TECHNICAL FIELD OF THE INVENTION

The present invention relates to a trimmer for trimming a bound material.

BACKGROUND OF THE INVENTION

A conventional trimmer is described in, for example, Patent Document 1. The trimmer comprises: a single trim cutter reciprocated in a vertical direction and between a non-trimming position and a trimming position; and a table for positioning the bound material placed thereon. In this conventional trimmer, an operator puts the bound material on the table and positions it properly, and then moves the trim cutter from the non-trimming position to the trimming position so as to cut an edge portion of the bound material. The operator rotates and positions the bound material at each of top, bottom, and fore-edge trimming positions, sequentially. The operator reciprocates the trim cutter at each of the positions so as to cut each of the top, bottom and fore-edge portions. Thus, each of the edge portions of the bound material is trimmed.

The other conventional trimmer described in, for example, Patent Document 2 is a three-side trimmer. The three-side trimmer comprises: a single trim cutter reciprocated in a vertical direction between a non-trimming position and a trimming position; a table for positioning a bound material placed thereon; and a rotate mechanism for rotating the table. A feeding mechanism supplies the bound material on the table, and the table with the bound material is rotated so as to position the bound material at each of top, bottom and fore-edge trimming positions by the rotate mechanism. Then, the trim cutter reciprocates at each of the positions to cut the top, bottom, and fore-edge portions.

By the way, as shown in FIG. 1, a bound material 1 comprises a book block 51 and a cover 50 attached to the book block 51. The cover 50 comprises flap portions 50*a* adjacent to the fore-edge portion 1*c* of the bound material 1. For example, a brief summary of a content of the bound material, an author's background description or things like that is described on the flap portions 50*a* at the side of the book block 51. In this case, the flap portions 50*a* may be undesirably cut off when the fore-edge portion 1*c* of the bound material 1 is trimmed by the above conventional trimmer.

The other conventional trimmer is described in, for example, Patent Document 3. The trimmer is called as a fore-edge trimmer, which can trim the fore-edge portion of the bound material except the cover in order not to cut the flap portions off. The trimmer comprises a trimming portion that trims the bound material, and a cover opening portion that opens the cover. The bound material is conveyed to the trimming portion through the cover opening portion, so that the cover can be open and the fore-edge portion except the cover can be cut off. However, the cover opening portion comprises complex different parts. As a result, the above conventional trimmer is not excellent in productivity and cost.

Patent Document 1: JP 2004-066347 A

Patent Document 2: U.S. Pat. No. 7,493,840 B

Patent Document 3: JP 2005-219168 A

SUMMARY OF THE INVENTION

Problems to be Solved by the Invention

It is an object of the present invention to provide a trimmer that can trim the fore-edge portion of the bound material except the cover and that can be excellent in productivity and cost.

Solution to the Problems

In order to achieve the object, the present application provides a trimmer for trimming an edge portion of a bound material.

The trimmer that trims a bound material which has a book block and a cover attached to the book block, the cover having flap portions adjacent to the fore-edge portion of the bound material, the trimmer comprising:

- a trim cutter that trims the bound material;
- a blade receiving portion that receives an edge of the trim cutter;
- a base portion and a pressure portion that nip and position the bound material; and
- a pair of guide portions arranged for movement in a direction close to or away from the bound material, wherein
- the guide portions are inserted between the book block and the cover so as to peel the cover together with the flap portions up when the fore-edge portion of the bound material is trimmed by the trim cutter.

According to a preferred embodiment of the present application, wherein each of the guide portions is attached to each of the base portion and the pressure portion.

According to a preferred embodiment of the present application, wherein each of the guide portions is inclined relative to face and reverse surfaces of the book block, and the guide portions are widened toward the trim cutter.

According to a preferred embodiment of the present application, wherein,

- when the fore-edge portion of the bound material is trimmed by the trim cutter,
- the book block is projected from the cover, one end portions of the guide portions are contacted with the face and reverse surfaces of the project portion of the book block,
- the bound material is moved toward the guide portions, and
- the guide portions are inserted between the book block and the cover so as to peel the cover together with the flap portions up.

According to a preferred embodiment of the present application, the trimmer further comprising a spring portion mounted between the guide portion and the pressure portion, wherein

- the guide portions are connected with the pressure portion via the spring portion and are movable with respect to the pressure portion by the spring portion.

According to a preferred embodiment of the present application, the trimmer further comprising:

- a table that positions the bound material placed thereon;
- a table unit that rotates the table in such a manner that the bound material is rotated to each of top, bottom, and fore-edge trimming positions; and a driving mechanism that moves the table and the trim cutter in a direction close to or away from each other relatively, wherein when the bound material is rotated to the fore-edge trimming position, the bound material is moved away from the base portion and the pressure portion, the one end portions of the guide portions are contacted with the face and reverse surfaces of the project portion of the book block, the bound material is moved toward the guide portions, the guide portions are inserted between the book block and the cover so as to peel the cover together with the flap portions up.

According to a preferred embodiment of the present application, the trimmer further comprising a fore-edge trimming portion that trims the fore-edge portion of the bound material, wherein the fore-edge trimming portion comprises the guide portions.

Effect of the Invention

The trimmer according to the present application can trim the fore-edge portion of the bound material except the cover and that can be excellent in productivity and cost.

BRIEF DESCRIPTION OF THE DRAWING

FIG. 1A is a plan view showing a bound material having a cover attached to a book block. FIG. 1B is a side view of FIG. 1A.

FIG. 2 is a perspective view showing a trimmer before a bound material is fed from a bound material feeding unit of a bound material loading table.

FIG. 3 is a perspective view showing the trimmer in which the bound material is positioned on a table of a table unit.

FIG. 4 is a perspective view showing a trim unit and a rotating table unit in which the top edge portion of the bound material is trimmed.

FIG. 5 is a perspective view showing the trim unit and the rotating table unit in which the bottom edge portion of the bound material is trimmed.

FIG. 6 is a perspective view showing the trim unit and the rotating table unit in which the cover together with flap portions is peeled up, and the fore-edge portion of the bound material is trimmed.

FIG. 7 is a side view showing the trim unit and the rotating table unit in which a trimming cutter is disposed on a non-trimming position.

FIG. 8 is a side view showing the trim unit and the rotating table unit in which the trim cutter is disposed on a trimming position, and the top edge portion or the bottom edge portion of the bound material is trimmed.

FIG. 9 is a side view showing the trim unit and the rotating table unit in which the trim unit is disposed on a stand-by position.

FIG. 10 is a side view showing the trim unit and the rotating table unit in which the trim unit is disposed on the trimming position, and the cover together with the flap portions is peeled up.

FIG. 11 is a side view showing the trim unit and the rotating table unit in which the trim cutter is disposed on the trimming position, and the fore-edge portion of the bound material is trimmed.

DETAILED EXPLANATION OF THE PREFERRED EMBODIMENTS

A trimmer according to the present application will be explained below with reference to the drawings.

Bound Material

Referring to FIG. 1, a bound material will be explained. The bound material 1 comprises a book block 51, and a cover 50 attached to the book block 51. The bound material 1 has a top edge portion 1*a*, a bottom edge portion 1*b*, a fore-edge portion 1*c* and a back portion 1*d*. The cover 50 comprises flap portions 50*a* adjacent to the fore-edge portion 1*c* of the bound material 1. For example, a brief summary of a content of the bound material, an author's background description or things like that is described on the flap portions 50*a* at the side of the book block 51. In the embodiment, the cover 50 comprises a pair of flap portions 50*a*. However, the cover 50 may comprise only one of the flap portions 50*a*.

Trimmer

Referring to FIGS. 2 and 3, a structure of the trimmer will be explained.

The trimmer comprises: a bound material feeding unit 2 for feeding a bound material 1 one by one; a table unit 3 receiving the bound material 1 from the bound material feeding unit 2 thereon at a predetermined position and rotatable with the bound material 1 at every predetermined angle in such a manner that the bound material 1 is positioned at each of top, front and bottom edge trimming positions; and a trim unit 4 arranged for movement in directions toward and away from the table unit 3. The trim unit 4 is configured to be moved between a trimming position and a stand-by position. The trimming position is adjacent to the table unit 3 for trimming a top edge area 1*a*, a bottom edge area 1*b* and a fore-edge area 1*c* of the bound material 1, respectively. The stand-by position is away from the table unit 3.

The bound material feeding unit 2 has a bound material loading table 24 on which a stack of the bound materials 1 is placed. A path 25 for transporting the bound material 1 extends between the table unit 3 and the bound material loading table 24. A discharge end of the path 25 is adjacent to the table unit 3, while a side section of a supply end thereof is adjacent to the bound material loading table 24.

The bound material feeding unit 2 also has a bound material feeding mechanism that feeds the bound material 1 from the bound material loading table 24 toward the path 25, one by one. The bound material feeding mechanism has a pair of endless belts 39 extending across and perpendicularly to the path 25 from both sides of the bound material loading table 24, and rollers 40*a* and 40*b* between which the endless belts 39 are extended. A support bar 44 having substantially a reverse U-shape is fixed to the pair of the endless belts 39. A plurality of suction heads 43 is mounted on the support bar 44 and faces downward. Suction heads 43 are spaced in a length direction of the support bar 44. In this way, the line of the suction heads 43 reciprocates between the bound material loading table 24 and the path 25 in a direction perpendicular to the path 25 by a drive of a motor 41.

The bound material feeding unit 2 also has a bound material transporting mechanism which transports the bound material 1 received from the bound material feeding mechanism on the path 25 toward the table unit 3 along the path

25. The bound material transporting mechanism has an endless belt 45 extending along and above the path 25 and rotatably supported by a frame 38. The endless belt 45 is rotatably driven by a motor 46 mounted to the frame 38. A chuck 47 is hung with the endless belt 45 and reciprocates between the bound material loading table 24 and the table 10 on the path 25 by the drive of the motor 46.

As described above, the bound material 1 placed on the bound material loading table 24 is absorbed one by one by the line of the suction heads 43, and then, it is fed in the direction perpendicular to the transporting direction of the bound material 1 to the path 25 in which its back 1*d* faces forward. The absorption by the line of the suction heads 43 is released, then the bound material 1 is gripped by the chuck 47 at this position. At this time, the face 33 of the chuck 47 comes in contact with the bottom edge 1*b* of the bound material 1. Then, the bound material 1 is transferred to the chuck 47. Thereafter, the chuck 47 moves toward the table unit 3 on the path 25, and when the top edge 1*a* of the bound material 1 comes in contact with the second upright plate 32, it stops. Thus, the bound material 1 is positioned on the table 10 in the top-to-bottom direction.

The table unit 3 has a base 9 and a rectangular table 10 which is provided with the top surface for supporting a bottom surface of a section of the bound material 1 except for the top edge portion 1*a*, the bottom edge portion 1*b* and the fore-edge portion 1*c* thereon. The table unit 3 also has positioning means for positioning the bound material 1 on the top surface of the table 10.

In this embodiment, the positioning means has a first upright plate 30 arranged on one side edge of the table 10, wherein a back 1*d* of the bound material 1 comes in contact with the upright plate 30. The first upright plate 30 is coupled to a slide driving mechanism (not shown) attached to the bottom surface of the table 10. Further, the positioning means has a second upright plate 32 to which the top edge 1*a* of the bound material 1 can contact. The second upright plate 32 is mounted on a feed screw 35 that is rotatably driven by a motor 34 supported by the base 9. In this way, the first and second upright plates 30 and 32 move in directions toward and away from the table 10 and they stop at a predetermined position corresponding to both a size and a receive position of the bound material 1 fed from the bound material feeding unit 2 (see FIG. 2).

The positioning means is further provided with a third upright plate 31 arranged opposite to the first upright plate 30 with the table 10 therebetween, so that the fore-edge 1*c* of the bound material 1 comes in contact with the third upright plate 31. The third upright plate 31 is mounted on a feed screw 37 which is rotatably driven by a motor 36 supported by the base 9, like the second upright plate 32, so that it moves in directions toward and away from the table 10. When the bound material 1 is placed on the table 10, the third upright plate 31 moves in a direction toward the bound material 1 until the back 1*d* of the bound material 1 comes in contact with the first upright plate 30 and the third upright plate 31 comes in contact with the fore-edge 1*c*. This achieves the positioning of the bound material 1 placed on the table 10 in the back-to-front direction (see FIG. 3).

The face 33 of the chuck 47 of the bound material feeding unit 2 that comes in contact with the bottom edge 1*b* of the bound material 1 also functions as a part of the positioning means. It performs the positioning of the bound material 1 in the top-to-bottom direction along with the second upright plate 32 (see FIG. 3).

A vertical shaft 12 is mounted on the bottom surface of the table 10, and the shaft 12 is held so as to be rotatable by a bearing 13 attached to the base 9. A motor 14 is coupled to the shaft 12, whereby the table 10 is rotatably driven by the motor 14.

A pressure plate 15 is arranged opposite to the shaft 12 above the table 10 for upwardly and downwardly movement between two positions of a stand-by position at which it is spaced from the bound material 1, and a pressure position at which it presses the bound material 1 against the table 10. The pressure plate 15 is attached to a piston-cylinder device 16 supported by the base 9 such that it can rotate at the pressure position along with the table 10 and the bound material 1. It is reciprocated between the stand-by position and the pressure position by the drive of the piston-cylinder device 16.

After the bound material 1 is positioned by the positioning means 30, 31, 32 and 33, the pressure plate 15 moves to the pressure position so as to fix the bound material 1 to the table 10. After the pressure plate 15 is disposed on the pressure position, the third upright plate 31, the second upright plate 32 and the chuck 47 (the face 33) of the positioning means are separated from the bound material 1 in order not to obstruct the rotational movement of the bound material 1.

The trim unit 4 has a frame 17. A base portion 18 is attached to the frame 17. When the trim unit 4 is disposed on the trimming position, the base portion 18 supports the bottom surface of the top edge portion 1*a*, the bottom edge portion 1*b* or the fore-edge portion 1*c* of the bound material 1 placed on the table 10 of the table unit 3.

A trim cutter 20 is arranged opposite to the blade receiving portion 19 above the base portion 18 for upwardly and downwardly movement. The trim cutter 20 takes two positions of a non-trimming position, at which it is spaced from the blade receiving plate 19, and a trimming position, at which it is pushed against the blade receiving portion 19 at its edge. A trim cutter driving mechanism 21 is attached to the frame 17 for reciprocating the trim cutter 20 between the trimming position and the non-trimming position.

The trim unit 4 comprises the blade receiving portion 19 for receiving the trim cutter 20. The blade receiving portion 19 is fixed to the upper surface of the base portion 18. The blade receiving portion 19 is, for example, made of a rubber material.

A pressure portion 22 is arranged above the base portion 18 for movement upwardly and downwardly between two positions of a non-pressing position where it is spaced from the bound material 1, and a pressing position where the bound material 1 is pressed against the base portion 18. The pressure portion 22 is reciprocated between the non-pressing position and the pressing position by a pressure portion driving mechanism 23. The pressure portion 22 is disposed on the pressing position when the trim cutter 20 moves from the non-trimming position to the trimming position, while the pressure portion 22 is disposed on the non-pressing position when the trim cutter 20 moves from the trimming position to the non-trimming position.

Two feed screws 5 are arranged horizontally between the table unit 3 and the trim unit 4, and they 5 are spaced from each other. The feed screws 5 are rotatably mounted to a support portion (not shown) fixed to another frame (main frame) 38. The frame 17 of the trim unit 4 is engaged with the feed screws 5. The feed screws 5 are coupled to a driving shaft of a motor 6 mounted on the frame 38, whereby the feed screws 5 are rotatably driven by the motor 6. A driving mechanism 56 is composed of the feed screws 5 and the motor 6. The driving mechanism 56 causes the trim unit 4 to move between the trimming position and the stand-by position along the axis direction of the feed screws 5.

There is provided a control unit 7 for controlling the operations of the table unit 3, the trim unit 4, the driving mechanism 56 (the motor 6), the slide driving mechanism and so on. The control unit 7 controls them in such a manner that the trim unit 4 moves from the stand-by position to the trimming position every time the bound material 1 is arranged at each of the top edge trimming position, the fore-edge trimming position and the bottom edge trimming position, to cut each of the top edge portion 1*a*, the fore-edge portion 1*c* and the bottom edge portion 1*b* of the bound material 1, respectively. A touch screen 70 is further connected to the control unit 7, so that an operator can set up the table unit 3, the trim unit 4 and the driving mechanism 56 (the motor 6) via the touch screen 70.

Guide Portion

Referring to FIGS. 4 and 7, a structure of the guide portion will be explained.

The trimmer comprises an upper guide portion 60 attached to the pressure portion 22, and a lower guide portion 61 attached to the base portion 18. Each of the guide portions 60, 61 is inserted between the book block 51 and the cover 50 so as to peel the flap portions 50*a* together with the cover 50 up. The peel up process will be explained below.

As shown in FIG. 7, each of the guide portions 60, 61 is inclined relative to the face and reverse surfaces of the book block 51. That's to say, the guide portions 60, 61 are widened toward the trim cutter 20. Each of the guide portions 60, 61 comprises one end portion 60*a*, 61*a* away from the trim cutter 20, and the other end portion 60*b*, 61*b* adjacent to the trim cutter 20. The one end portions 60*a*, 61*a* are disposed adjacent to the face and reverse surfaces of the book block 51. The other hand, the other end portions 60*b*, 61*b* are disposed away from the face and reverse surfaces of the book block 51.

As shown in FIG. 4, the trimmer comprises a pair of connecting portions 63 attached to the pressure portion 22. The trimmer comprises a pair of spring portions 62 mounted on each of the connecting portions 63. The spring portion 62 is mounted between the upper guide portion 60 and the pressure portion 22.

The upper guide portion 60 is connected with the pressure portion 22 via the spring portion 62. As a result, the spring portion 62 is configured to have the upper guide portion 60 movable with respect to the pressure portion 22. This point will be explained below.

Trimming Process and Peeling up Process

Referring to FIGS. 4 to 11, a trimming process and a peeling up process will be explained below. The top edge portion 1*a*, the fore-edge portion 1*c* and the bottom edge portion 1*b* of the bound material 1 are trimmed in the trimming process, and the cover 50 together with the flap portions 50*a* is peeled up in the peeling up process.

At first, as shown in FIG. 4, the table unit 3 is configured to rotate the table 10 in such a manner that the top edge portion 1*a* of the bound material 1 is disposed parallel to the trimming cutter 20 and on the top edge trimming position. Then, as shown in FIG. 7, the trim unit 4 is moved from the stand-by position to the trimming position. Then, the pressure portion 22 together with the upper guide portion 60 is moved from the non-pressing position to the pressing position so as to nip and fix the bound material 1 over the cover 50. Then, as shown in FIG. 8, the trim cutter 20 is moved from the non-trimming position to the trimming position so as to trim the top edge portion 1*a* (the book block 51 and the cover 50) of the bound material 1.

Next, as shown in FIG. 5, the table unit 3 is configured to rotate the table 10 in such a manner that the bottom edge portion 1*b* of the bound material 1 is disposed parallel to the trim cutter 20 and on the bottom edge trimming position. Then, similarly to the above description, as shown in FIGS. 7 and 8, the pressure portion 22 together with the upper guide portion 60 nip and fix the bound material 1 over the cover 50, and then the trim cutter 20 trims the bottom edge portion 1*b* (the book block 51 and the cover 50) of the bound material 1.

Next, as shown in FIG. 6, the table unit 3 is configured to rotate the table 10 in such a manner that the fore-edge portion 1*c* of the bound material 1 is disposed parallel to the trim cutter 20 and on the fore-edge trimming position. Then, differently from the above description, as shown in FIG. 9, the pressure portion 22 together with the upper guide portion 60 is moved from the non-pressing position to a peeling up position while the trim unit 4 is stopped at the stand-by position.

The peeling up position is disposed between the non-pressing position and the pressing position. The peeling up position is decided on the basis of the thickness T of the book block 51. The one end portion 61*a* of the lower guide portion 61 is positioned so as to be aligned with a contact surface 18*a* of the base portion 18. The one end portion 60*a* of the upper guide portion 60 is positioned closer to the bound material 1 than a contact surface 22*a* of the pressure portion 22 when the pressure portion 22 together with the upper guide portion 60 is disposed on the peeling up position.

The book block 51 is projected from the cover 50 at the fore-edge portion 1*c* of the bound material 1. The one end portion 61*a* of the lower guide portion 61 is contacted with the projecting portion 51*a* of the book block 51 when the pressure portion 22 together with the upper guide portion 60 are disposed on the non-pressing position. Then, the one end portion 60*a* of the upper guide portion 60 is contacted with the projecting portion 51*a* of the book block 51 when the pressure portion 22 together with the upper guide portion 60 are disposed on the peeling up position.

The peeling up position may be decided on the basis of the previously measured value of the thickness T of the book block 51. The peeling up position is decided in a way that a sensor (not shown) connected with the upper guide portion 60 senses that the one end portion 60*a* of the upper guide portion 60 is contacted with the projecting portion 51*a* of the book block 51. The spring portion 62 can absorb an error of the peeling up position of the upper guide portion 60.

Then, as shown in FIG. 10, the trim unit 4 is moved from the stand-by position to the trimming position. As a result, the bound material 1 is moved in such a manner that the cover 50 is moved toward the guide portions 60, 61. Each of the guide portions 60, 61 is inserted between the book block 51 and the cover 50 so as to peel the cover 50 together with the flap portions 50*a* up since each of the guide portions 60, 61 is inclined in relative to the face and reverse surfaces of the book block 51.

Then, as shown in FIG. 11, the pressure portion 22 is moved from the peeling up position to the pressing position so as to nip and fix the bound material 1 (only the book block 51). The upper guide portion 60 is contacted with the book block 51 and is not moved by the spring 62 even though the pressure portion 22 is moved. Then, the trim cutter 20 cuts the fore-edge portion 1*c* (only the book block 51) of the bound material 1. As a result, only the book block 51 except the cover 50 is cut, but the flap portions 50*a* are not cut.

As described above, preferred embodiments of the present invention are explained. However, constructions of the present invention are not limited to the embodiments. The constructions of the present invention may be changed and modified as follows.

The trimmer may not be the three-side trimmer. That's to say, an operator may rotate the bound material 1 by oneself so as to dispose the bound material 1 on each of top, bottom and fore-edge trimming positions.

The trimmer may be called as a fore-edge trimmer, which can convey the bound material 1 toward the trimming portion at which the fore-edge portion of the book block except the cover is trimmed.

The guide portion may have an arc-shaped cross section.

The driving mechanism 56 may be configured to move the table unit 3 toward the trim unit 4. And, the driving mechanism 56 may be configured to move both the table unit 3 and the trim unit 4.

The guide portions 60, 61 may be divided and away from the base portion 18 and the pressure portion 22. And, the guide portions 60, 61 may be arranged for movement in a direction close to or away from the bound material 1.

DESCRIPTION OF REFERENCE NUMBERS

1 bound material
50 cover
51 book block
51*a* projecting portion
50*a* flap portion
20 trim cutter
19 blade receiving portion
18 base portion
22 pressure portion
60, 61 guide portion
60*a*, 60*b* one end portion of guide portion
60*b*, 61*b* other end portion of guide portion
62 spring portion
1*a* top edge portion of bound material
1*b* bottom edge portion of bound material
1*c* fore-edge portion of bound material

The invention claimed is:

1. A trimmer that trims a bound material which has a book block and a cover attached to the book block, the cover having flap portions adjacent to a fore-edge portion of the bound material, the trimmer comprising:

a trim unit;

a table that positions the bound material placed thereon;

a rotating table unit that rotates the table in such a manner that the bound material is rotated to each of a top, a bottom, and a fore-edge trimming position;

wherein the trim unit includes:

a trim cutter that trims the bound material;

a blade receiver that receives an edge of the trim cutter;

a base and a presser that nip and position the bound material; and a pair of guides including an upper guide attached to the presser and a lower guide attached to the base; and a presser driver that reciprocates the presser in a first direction between a non-pressing position and a pressing position, the non-pressing position being a position where the presser is spaced from the bound material, the pressing position being a position where the bound material is pressed against the base, the first direction being a direction in which the presser moves upwardly and downwardly with respect to the bound material; and the trimmer further comprising a driver that moves the trim unit and/or the table in a second direction intersecting the first direction between a trimming position and a stand-by position, the trimming position being a position at which the fore-edge portion of the bound material is disposed between the presser and the base, the stand-by position being a position at which the edge fore-edge portion of the bound material is not disposed between the presser and the base; wherein the presser driver moves the upper guide and the presser from the non-pressing position to a peeling up position while the trim unit and/or the table is positioned at the stand-by position, the peeling up position being disposed between the non-pressing position and the pressing position in the first direction, the upper guide being contacted with the book block when the upper guide and the presser are moved from the non-pressing position to the peeling up position; and wherein the trimmer is further configured such that the upper guide and the lower guide are insertable between the book block and the cover so as to peel the cover together with the flap portions up when the driver moves the trim unit and/or the table from the stand-by position to the trimming position in the second direction, and further comprising a spring mounted between the upper guide portion and the presser, wherein the upper guide is connected with the presser via the spring and is movable with respect to the presser by the spring.

2. The trimmer according to claim 1, wherein each of the pair of guides is inclined relative to a face surface and a reverse surface of the book block, and the pair of guides are widened toward the trim cutter.

3. The trimmer according to claim 1, wherein the driver moves the table and the trim cutter in a direction close to or away from each other relatively, wherein the trimmer is further configured such that when the bound material is rotated to the fore-edge trimming position, the bound material is moved away from the base and the presser, the one end portions of the pair of guides are contacted with the face surface and reverse surface of a project portion of the book block, and the bound material is moved toward the pair of guides.

4. The trimmer according to claim 1, further comprising a fore-edge trimmer that trims the fore-edge portion of the bound material, wherein the fore-edge trimmer comprises the pair of guides.

* * * * *